July 13, 1943.  E. M. KELLY ET AL  2,324,400
LIQUID CLARIFICATION
Filed June 21, 1941  2 Sheets-Sheet 2

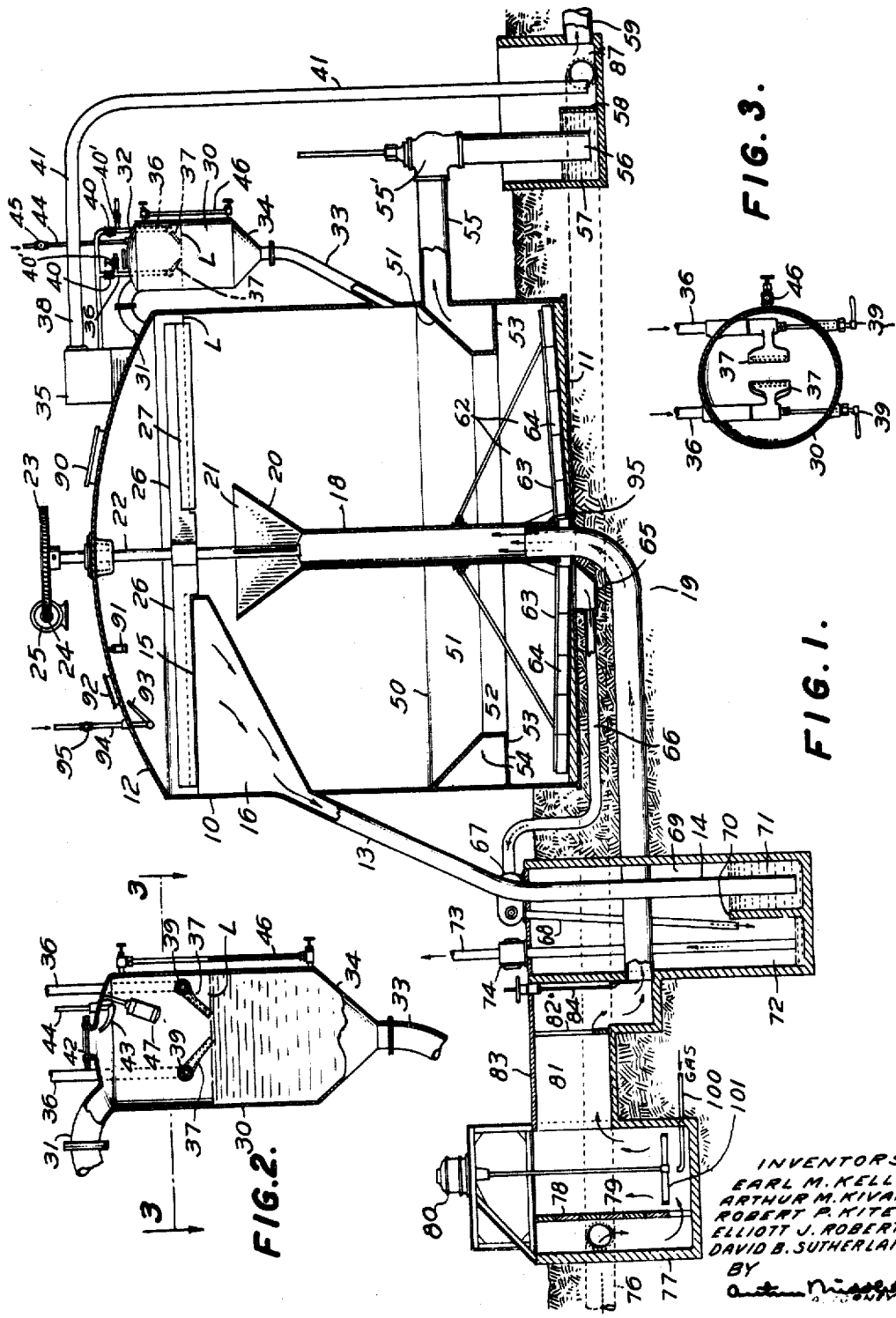

INVENTORS
EARL M. KELLY,
ARTHUR M. KIVARI,
ROBERT P. KITE,
ELLIOTT J. ROBERTS,
DAVID B. SUTHERLAND,
Arthur Middleton
ATTORNEY.

Patented July 13, 1943

2,324,400

UNITED STATES PATENT OFFICE 2,324,400

LIQUID CLARIFICATION

Earl M. Kelly and Arthur M. Kivari, Los Angeles, Calif., Robert P. Kite, Larchmont, N. Y., Elliott J. Roberts, Westport, Conn., and David B. Sutherland, Montclair, N. J., assignors to The Dorr Company, Inc., New York, N. Y., a corporation of Delaware Application June 21, 1941, Serial No. 399,058

13 Claims. (Cl. 210—2)

This invention relates to the clarification or purification of liquids and especially those that are impure or polluted such as sewage, trade and dairy wastes, packing and cannery wastes, oil refinery wastes, and the like that are characterized in that some constituents thereof must be removed from the water before it can be either re-used or released into water-courses like rivers and streams, or into the ocean.

Such constituents may comprise any particles of turbidity that interfere with the clarity of the water and also particles of matter of organic origin which is not removed from the water would cause its pollution. Such constituents, in general, exist in the waste waters in the form of suspended matter whose settleability ranges from normally readily settleable solids such as grit, up through varying degrees of normally semi-floatability and difficult settleability to colloids and oil or grease that are normally non-settleable.

So one object of this invention is to devise an improved method and apparatus for the efficient removal by reduced pressure flotation of floatable or suspended matter from liquids that contain them. Such liquids are well exemplified by sewage. Sewage is treated usually by inflowing it to relatively large settling basins often called sedimentation tanks or clarifiers. Sewage is held in them in quiescence so that those suspended solids that will settle, do settle and deposit on the bottom of the clarifier as sediment. Mechanical means are usually provided for raking the sediment from the tank bottom to discharge. These clarifiers have the size controlled by the overflow rate and detention time necessitated by the settling rates of the suspended solids to be settled. This makes these clarifier tanks relatively large, in some cases a hundred or more feet in diameter. Some of the suspended material is floatable, which tends to rise to the surface of the liquid in the clarifier and form into a disagreeable scum. The skimming of such tanks has presented a serious mechanical problem.

Therefore another object of this invention is to devise equipment that will remove settleable matter from polluted liquids rapidly and without the necessity of the usual long detention period, whereby the equipment can be made substantially smaller. And a further object is to arrange such equipment so it will also remove floatable matter as scum about as fast as accumulated on the surface of the liquid.

Sewage and the like polluted liquids are usually either unsightly or odoriferous, or both, so it is another object of this invention to devise equipment for the clarification thereof that is covered whereby the liquid being treated is maintained out of view.

A still further object of this invention is to cause certain normally non-floatable suspended solids to be floated with a concurrent improvement in settling the non-floatable and normally settleable suspended solids.

The invention is preferably embodied in equipment wherein the polluted liquid has gas diffused therein, called hereafter gassed liquid; the gassed liquid is conducted to, and released in proximity to the surface of, a body of liquid being treated, on the surface of which liquid there is effective a pressure that is less than that on the gassed liquid. Normally the gased liquid is supplied under atmospheric pressure while the pressure on the surface of the liquid being treated is sub-atmospheric, namely, under the effect of vacuum. Moving means are provided for skimming floated matter, including scum, foam, oil or grease, into an arrangement that includes a dam over which the floating matter is removed from the zone of treament of the liquid.

Important in such an arrangement is the control for maintaining of a constant liquid level for the body of liquid being treated, and preferably it should be adjustable. In the preferred embodiment of this invention, this is accomplished by maintaining in what may be called a control box, a relatively small or minor body of liquid being treated apart from the main body so as to be substantially free from scum or floating solids but in hydraulic communication therewith at the bottom portion while in gaseous communication at its top portion with the gaseous but reduced pressure atmosphere overlying the liquid being treated.

Another characteristic of this invention is that associated with the minor or auxiliary body of liquid in the control box, there are suction-applying means primarily for applying the effect of vacuum to the main body of liquid which automatically cease applying suction when excess liquid accumulates above the desired liquid level. These means are exemplified by a suction pipe or nozzle connected to a wet vacuum pump, and the pipe may also be pivotally adjustable for controlling the height of the controlled liquid level. Clarified or treated liquid is removed from the equipment in quantity equal to the liquid incoming thereto for treatment, so the machine is continuous in operation. Also, the clarified liquid that is removed, is derived from a zone of materially lessened effect of vacuum and also from a place whereat the withdrawn liquid is shielded from descending of settling solids.

The sequential gassing and vacuum, or reduced pressure, treatment seems to cause not only the normally floatable matter but importantly a substantial quantity of normally non-floatable and normally difficultly settleable suspended solids, as well as semi-floating solids, to rise or to be buoyed to the liquid surface from whence they are removed by the skimming means. Other suspended solids seem to have their settleability increased, so that as a result of the vacuum treatment, solids from some liquids settle to the bottom of the tank and deposit as sediment, whereupon they are independently removed. When treating some liquids, the clarified liquid can be removed from the tank through the vacuum suction pipe, while in treating other liquids, it may be desirable to remove the treated liquid from another zone or zones of the tank.

Since it has been found that the vacuum is effective to the maximum to float suspended solids substantially only when they are exposed to the vacuum effects at the liquid surface, it is important that the velocity of the suspended solids fed to the machine shall be such that solids reach the region of the liquid surface of the body of liquid being treated. To this end, the liquid to be treated is preferably supplied to the tank by means of a draft tube that is so calibrated and so shaped that the suspended solids in the feed passing up through the draft-tube are emitted therefrom into that zone in which the vacuum becomes effective on them. The design and shape of the draft-tube should be such as to give a velocity of the feed liquid up the draft-tube so that there is discouraged any dropping back down in the draft-tube of settling solids because once they start downwardly, the pull of the vacuum is not very strong on them. At the same time, however, the velocity of the liquid emitted from the mouth of the draft-tube should not be great enough to cause substantial up-surge or turbulence in the liquid thereabove. The reason for this is that it causes the bubbles buoying up the floated solids to be shaken loose therefrom, whereupon those solids descend and thus escape being skimmed off the liquid level as scum. Experience has shown that the mouth of the draft-tube can be located conveniently about fifteen inches below the liquid level although it can be used varyingly in a range substantially between two and fifteen inches. Experience has also shown that the degree of vacuum used is important. Below five inches of mercury, there is little effectiveness. Indeed, not less than seven inches of mercury seems to be about the minimum degree of vacuum used, and nine inches or higher, is best. Therefore, that latter figure is recommended. It takes 13.6 inches of water to equal one inch of mercury. Therefore, in order to have at least some degree of vacuum effective on all the liquid in the tank, except of course that on the bottom thereof, the tank should be of on the order of 9 x 13.6 inches in depth, or roughly 10 feet. In such a tank, while there is vacuum equal to about 9 inches of mercury effective on the liquid level in the tank, at one foot below the liquid level, the vacuum equals about 8 inches of mercury, and so on down, each foot of depth taking off about one mercury inch of effectiveness of the vacuum. Beyond five feet or 5 mercury inches), however, there seems to be little vacuum effect, but this is desirable for it leaves that zone of liquid below the five foot level, in relative quiescence in which those solids of high specific gravity settling thereto, are permitted unmolestedly to form a sediment on the tank bottom, from which they can be removed as desired. The point of their withdrawal is preferably from a region within the treatment tank that is under the effect of vacuum equal to five inches or less of mercury, because this assures no floating material being carried off with the sediment. Discharge of materials from such a machine naturally has to be through the medium of a liquid-sealed barometric or hydrostatic leg or its equivalent, for otherwise the effect of vacuum would be lost by air-leakage.

It is generally desirable that nothing be interposed between the liquid level and the effect of the vacuum that interferes with the effectiveness of the vacuum. In order to keep the liquid level clean and clear of vacuum-obstructing material, this invention teaches that it is advisable to remove from the liquid level scum or other float'ng material (sometimes called herein "float") about as fast as formed so that there is no adverse accumulation thereof, and with the least disturbance of the underlying liquid. In order to accomplish this persistent and non-turbulent cleaning of the liquid level, it is also necessary to maintain the liquid level at a constant height so that floating material can be constantly and effectively removed therefrom. Where skimming is important of itself, the character of the scum may be controlled somewhat by the height of the liquid level as compared with the effective level of the overflow weir or dam of the scum discharge arrangement. If for instance, a material being handled forms a thick compact scum and it is desired to discharge this scum with a minimum of water-content, then the liquid level of the tank can be lowered to an elevation several inches below the scum overflow weir independent of the scum discharge arrangement, through the medium of control features of the auxiliary compartment or control box with its adjustable suction nozzles. If on the other hand, the material handled does not form a compact scum, or if its water content is unimportant, the l'quid level elevation of the tank can then be adjusted to a point from which most or all of the float will flow by gravity over the dam into the scum discharge outlet. One purpose of getting the scum or float out as soon as possible is so that the air bubbles attached to the solids are not detached, for if detached in any substantial quantity, the buoyed up solids will settle and go out with the effluent.

The flotation effects attained by this vacuum treatment on suspended solids take place within a rather limited range of degrees of vacuum, so as much as possible of the floatable material must assuredly be conveyed into that horizontal layer of liquid subject to such vacuum. This is assisted to some extent by first diffusing dissolving air or gas in the liquid fed to the vacuum tank whereby when the suspended particles encounter the lessened pressure in the tank, the dissolved and entrained gas is released to form gas bubbles that attach themselves to solid particles and tend to float most of the suspended material into that area of limited vacuum effect. Aeration or gassing of the liquid prior to its release into body of liquid being treated under the effect of vacuum, has proven to be quite satisfactory since it effects the diffusing of the air or gas in the liquid, but in such a case, it is usually desirable to give the aerated liquid some de-aerating treatment prior to its release in the liquid body in order to remove from it substantially all large or coalesced bubbles. Rising bubbles enlarge in ascending, and an expanding bubble tends to detach itself from the solid that is buoying up or floating. Therefore, the finer or smaller the bubbles developing from the liquid under vacuum the better, for merely large entrained air bubbles are useless for the flotation function. In fact the large bubbles are detrimental because they cause undue agitation on being released.

Non-settleable and slow settling suspended solids interfere with the settling of readily settleable solids, but the sequential gassing and vacuum treatment of this invention seems to pull the slow settling suspended solids up and out so that the left-behind non-floatable and settleable solids can assume their normal free settling rates. Thus in a machine embodying this invention, settleable solids settle better. The vacuum and the rising force exerted by the air bubbles on the suspended solids act like a collector, especially when there are grease or other foam- or froth-forming substances present, as is especially true in sewage and the like wastes. The vacuum apparently has a de-aerating effect. For instance, it makes activated sewage sludge sink. It has a depressant effect on settleable solids, although not on slick solids. This type of action resulting from the effect of vacuum, when sewage and the like are treated, floats grease-bearing particles and other floatable material away from the settleable inorganics, so that the sediment separated and discharged by the apparatus of this invention is fairly clean. The vacuum will cause to float normally non-floatable inorganic matter of some types such as lime sludge derived from water softening, as magnesium hydroxide, borax, potash and the like.

With respect to the treatment of sewage, it is to be recalled that sewage coming to a treatment plant at times has a relatively high temperature. This, together with flat sewer grades and long flow lines, often results in considerable anaerobic bacterial action taking place in the sewage prior to clarification treatment, with the result that there are usually present in the incoming sewage substantial quantities of gas bubbles, buoyed scum, and floating, partially-digested sewage sludge. The discharge of large quantities of cannery wastes into sewerage systems aggravates this problem and increases the floating scum. The apparatus of this invention is quite effective on these conditions, for not only are the scum and the sludge separated, but the sewage being treated in the machine is de-gassed.

The presence of finely-divided gas bubbles in sewage or other liquid has a decidedly detrimental effect on clarification by sedimentation; so to rid the sewage of its entrained gas, substantially facilitates the subsequent sedimentation. And again, as sewage and the like wastes are usually highly odorous, the vacuum removal of this invention rids the liquid of its entrained gases and thereby reduces their odor-giving content.

The trade-mark "Vacuator" has been given to and used in connection with embodiments of this invention, prior to the filing of this application, so that term for short, may be used hereinafter. A major characteristic of a Vacuator is the vacuum removal from liquids not only of normally floatable matter but also of normally non-floatable matter. A further charactreistic is the simultaneous independent removal from liquids of normally non-floatable and of settleable suspended matter desired to be removed therefrom. Thus it is a machine that accomplishes removal of matter from the liquid by physical means in distinction from biologic or bio-chemical means. In some cases, the Vacuator may be used as a skimmer only, so that scum is discharged from it by one path, while by another path there is passed from the Vacuator, de-scummed liquid with non-floatable solids unremoved from suspension therein. Other uses may call for three separate discharge paths leading from the Vacuator namely (1) for scum, (2) for clarifier effluent, and (3) for sediment or sludge. The Vacuator has proven that it can do a fair job of removing suspended solids at as high an overflow rate as 10,000 gallons per sq. ft. per 24 hours.

Fig. 1 is a vertical sectional view of a continuous type of apparatus for separating and removing of suspended matter from a liquid body. In connection with this figure it is to be noted that a large main separating tank prominently appears and that a small or auxiliary liquid-level control tank or chamber is shown at the right-hand side of the large main tank.

Fig. 2 is a vertical sectional view of the auxiliary liquid-level control tank or chamber. In Fig. 2 the parts are shown at a larger scale than in Fig. 1.

Fig. 3 is a horizontal sectional view taken as on the line 3—3 of Fig. 2 looking in the direction of the arrows.

Figure 4:
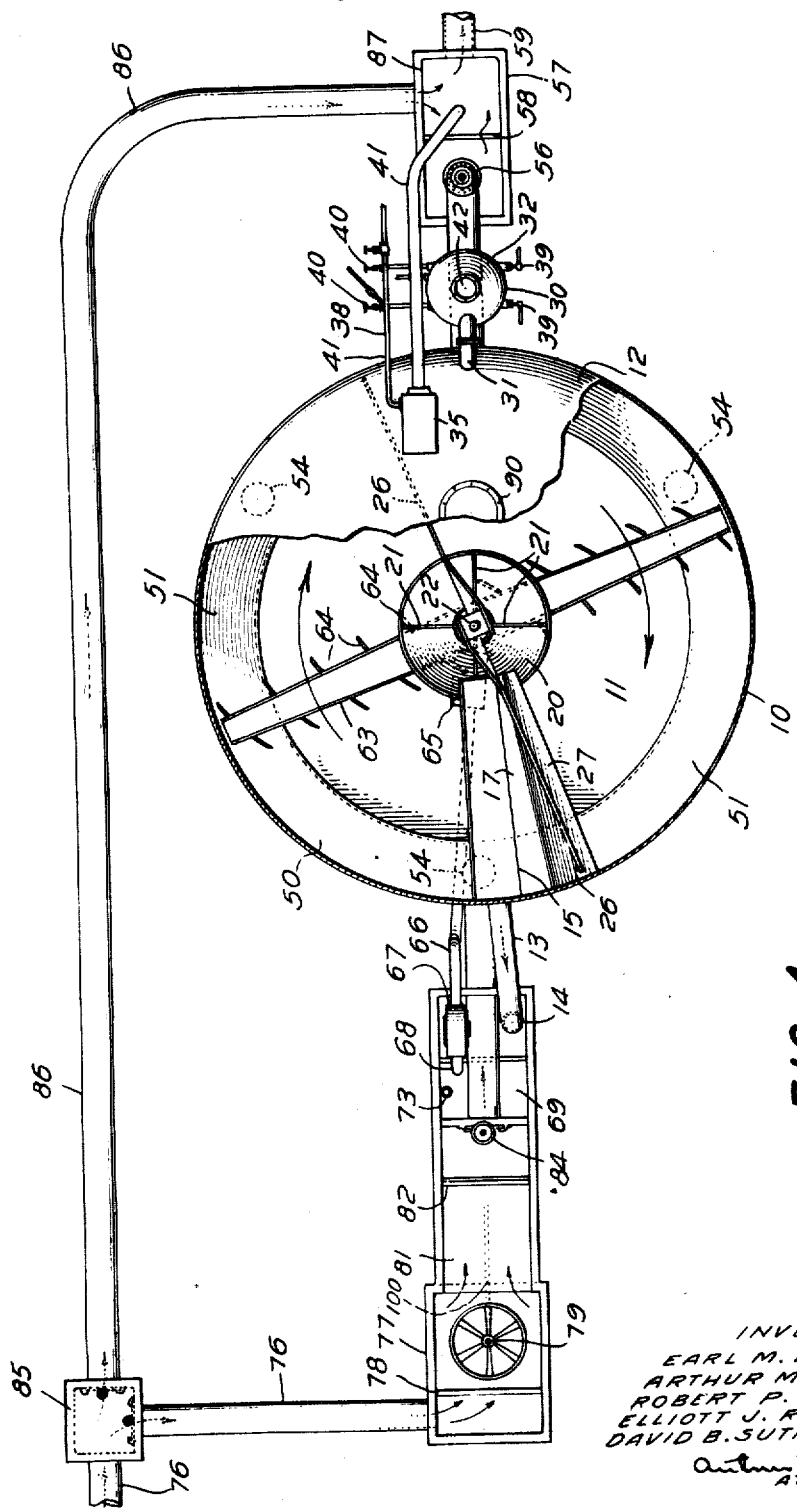
Fig. 4 is a plan view of the apparatus of Fig. 1. In this figure certain parts of the top of a main separating tank thereof have been broken away to show more clearly the construction of certain functional parts therein.

In the accompanying drawings: 10 represents a main tank, 11 its bottom or floor, 12 its closed roof or top, 13 a scum discharge duct or pathway having a barometric or hydrostatic leg 14, 15, an elongated edge, dam or weir that is not normally submerged, 16 a funnel section of the scum discharge duct 13 that supports the weir 15 and a ramp 17 leading up to the weir. 18 represents an upstanding draft-tube, 19 a feed inlet pipe or conduit of which the draft-tube forms a functional terminal. 20 represents a flared outlet section of the draft-tube 18, 21 a spider therein by which the draft-tube is supported from shaft 22 rotatably penetrating, in a gas-tight manner, the tank roof 12, which shaft is provided with a worm gear 23 that is rotated by a worm 24, driven by a motor 25. 26 indicates scum raking arms, extending substantially radially from the shaft 22, and 27 indicates scum sweeps carried by the arms 26 that are adapted for scum sweeping cooperation with the ramp 17 and weir 15.

30 represents generally a supplemental or auxiliary tank or compartment, which with its assembly constitutes an arrangement for applying the effect of vacuum to the main tank 10, and also for controlling the height of the liquid level L in the main tank. 31 indicates a freely communicating passageway provided by a pipe extending between the upper section of the main tank and the upper section of the auxiliary or secondary tank 30. 32 indicates a closed top or roof on the secondary tank 30, while 33 indicates a liquid pathway or communicating pipe extending between the bottom 34 of the tank 30 and to the interior liquid-holding portion of the main tank 10.

35 indicates a wet-vacuum pumping means for sucking air or gas from the interior of the secondary tank 30 by such conduit means as a pipe 36 that terminates in an adjustable inlet end or nozzle 37. Pipe 36 and nozzle 37 can be duplicated as shown. If duplicated both pipes 36 will merge into a single pipe 38 leading to the pump 35. The inlet ends or nozzles 37 are pivotally adjustable by means of hand-operated shafts 39 that extend through the casing of the second tank 30. 40 indicates a valve that can be inserted in each suction pipe 36. 41 indicates a discharge pipe line extending from the vacuum pump 35, as shown. 42 indicates a port-hole or inspection glass in the top of the secondary tank 30. 43 indicates a water jet or spray to which water is supplied by pipe 44 that is controlled by valve 45, for washing the underside of the glass 42 free of scum accumulations thereon. 46 indicates a gauge glass on the tank 30. A protected electric light 47 may be located within the tank 30 adjacent the port-hole glass 42 to illumine the contents of the tank for better view thereof through the port-hole.

50 indicates baffling means within the main tank 10 forming a ring-like or annular effluent take-off system for the main tank, for shielding the withdrawn liquid from descending or settling solids at the place of withdrawal of the effluent liquid from the liquid body in the tank. This is preferably provided with a downwardly inclined top member 51, a cylindrical member 52, a horizontal closure member 53 having apertures 54 therein located at intervals. 55 indicates a treated liquid, or effluent take-off discharge pipe valved at 55' that is provided with a barometric or hydrostatic leg 56 that dips into a basin or pool 57 formed by means of an adjustable dam or weir 58, over which liquid flows to discharge through effluent discharge pipe 59.

Fig. 1 shows an optional assembly of sediment or sludge raking mechanism, supported from and rotating with the draft-tube 18. It comprises rake arm 63 extending generally outwardly from the draft-tube 18 (and, if necessary, braced with tie rods as shown) that are provided with sediment or sludge impelling or plowing means such as blades, rakes or edges 64, which incident to travel thereof adjacent the tank bottom or floor 11, impel sediment towards and into sludge sump 65, from which sediment can be discharged through pipe 66 and pump 67 downwardly through pipe 68 leading to a no-pool part 72 of the depressed sump 69.

Sump or wet-well 69 has in its bottom section an adjustable dam or weir 70 for forming a basin or pool 71 adapted for the sealing barometrically of the leg 14 of the scum discharge duct system 13. In the non-pool part 72 of the sump 69, a pipe 73 reaches thereinto associated with which is a pump 74 for conveying the scum and sediment to further treatment or disposal. 76 indicates a pipe through which flows the impure or polluted liquid supplied for treatment. This pipe 76 delivers the liquid into a wet-well or sump 77, wherein the liquid passes under an adjustable curtain baffle 78. 79 indicates a gassing station or gas diffusing means for causing gas or air to be dissolved and entrained in the incoming liquid. In the drawing it is shown as a diffusing or gassing impeller on a shaft driven by a motor 80. 81 indicates a de-aerating or de-gassing flow- through passage or channel, in which there is an adjustable height weir 82 over which the liquid cascades before entering the Vacuator feed pipe 19. This passageway 81 is for de-aerating the liquid to rid it of enlarged entrained gas bubbles.

83 indicates a cover on the de-aerating passageway to make the apparatus sightly. 84 indicates a gate valve and means for operating it to open or close the entrance to the feed pipe 19. 85 indicates a junction box and 86 a pipe, whereby the newly incoming liquid can be by-passed around the Vacuator, if desired, since the pipe 86 joins into the sump 87, that is adjacent the pool 57. The discharge line 41 from the vacuum pump 35 also discharges into this sump 87, from which all liquid is discarded through pipe 59.

90 represents a manhole cover in the top 12 of the tank 10 for entrance purposes. 91 indicates an electrical light for illuminating the interior of the tank 10. 92 indicates a glass-bearing port-hole in the top of the tank 10 for visual inspection purposes, and 93 indicates a water jet or nozzle, supplied from pipe 94 with its valve 95, for washing scum from the underside of the glass of the port-hold 92.

It is to be observed that the inlet pipe 19 to the tank 10 has as its vertically-extending terminal the draft-tube 18. Under those circumstances where it is desired to have the draft-tube rotatable, there is provided a liquid-tight slip-joint as at 96 whereby the lower section of the rotatable draft-tube can rotate freely around the stationary upstanding end of the pipe 19 without loss of liquid therebetween.

100 represents a pipe or conduit for conducting gas to the gassing station 79, if desired instead of air, to be diffused in the liquid being treated, a gas such as $CO_2$ that is inert to an oxygen demand of the liquid.

The operation of the Vacuator is as follows: the incoming new liquid to be treated therein first is to have gas, such as air, diffused therein. This is done in a gas-dissolving station, in the embodiment illustrated by means of usual aeration by the use of an aerating impeller 101. Thereafter, the larger bubbles, and at least some entrained air, are de-aerated from the liquid in the passageway 81. The gassed and de-aerated liquid then passes through the feed pipe 19 and upwardly in the draft-tube 18 due to the effect of vacuum within the main tank 10. There is maintained within the tank 10 an ever-changing body of liquid being treated, which reaches to a liquid level L that is carefully controlled by means of the control assembly 30. The liquid rises in the control or secondary tank or compartment 30 through the pipe 33. The vacuum pump 35 in exerting a gas-exhausting suction through nozzles 37 on the interior of the secondary tank 30 above the liquid level L therein also produces a corresponding effect of vacuum in the upper section of the main tank 10 that is above its liquid level L, through the medium of the freely communicating passageway or pipe 31 that extends between the upper sections of the main and secondary tanks.

Th liquid level L in the secondary tank 30 is controlled through the adjustment of the nozzles 37, for the pump 35 is a wet-vacuum pump. If the liquid level tends to rise about the level of the nozzles 37, liquid is pumped therethrough until the liquid level in both tanks returns to normal. Any liquid sucked up by the pump 35 is discarded through pipe 41. It is to be noted that the minor body of liquid being treated that is hydrostatically contained within the secondary tank 30 is shielded from having any scum or floating material reaching it, because it is connected to the main tank at a point below which the scum has been released.

Liquid passes up the draft-tube in the main tank 10 and is emitted into the body of liquid in the tank at a diminished velocity, due to the flare 20 of the draft-tube 18. The velocity is diminished so that there is substantially no turbulence created above the draft-tube and its flared section, namely, in the liquid that is there located.

The tube-type of delivery of feed liquid is for avoiding as much as possible dispersion or diffusion of the vacuum-floatable particles in the liquid body of the tank prior to realizing the lifting effect of vacuum on them.

The avoidance of turbulence, in this rather critical zone of vacuum action, is desirable as turbulence is disadvantageous to flotation since it tends to shake bubbles loose from the solids to which the bubbles have become attached. As soon as the liquid is released from the draft-tube 18, the lessened pressure or effect of vacuum, causes the dissolved and finely divided entrained gas in the liquid to come out of the solution, whereupon bubbles of gas are developed that cling to suspended solids encountered by the gas bubbles. In sewage and the like wastes, there is enough oil and grease on the suspended solids to act as an adhesive to cause the bubbles to adhere to the solids, whereupon the bubbles cause the solids to which they are attached to be buoyed up and to float to the liquid level L. Accumulation of the floated solids forms a floating layer of scum.

It is desirable to continually remove the scum to leave the liquid level as free thereof as possible. To this end, the scum arms 26 are rotated with shaft 22 from motor 25. The scum arms with their sweeps 26 push scum in front of them until the ramp 27 is encountered, when the sweeps 27 in riding up onto the ramp, push the scum before them, and over the scum dam 15. The scum falls from or cascades over the dam into the funnel section 16 of the scum removing duct means that includes the pipe 13, through which pipe plus its barometric leg 14, the scum is discharged from the main tank 10 and into the pool or basin 71 in a manner which prevents any air leakage into the tank 10 to otherwise spoil or diminish the vacuum therein.

Liquid from which the floated material has been removed, is discarded from the tank as treated liquid or effluent through the effluent take-off assembly 50, by rising upwardly through the apertures 54 into the annular baffled space, from whence it flows to discharge through pipe 55, which also is a barometric leg since it terminates in pool 57, to prevent air leakage into the tank 10. The assembly 50 shields the drawn-off effluent from descending or settling solids, and the assembly is located at a depth in the tank at which the effect of vacuum is equal to the order of 5 inches of mercury. It is the place or region where there is a minimum of suspended solids and a minimum of sedimented solids. In those cases where the Vacuator is to be used only to de-scum the liquid to be treated, the effluent take-off will constitute the only other discharge duct from the tank besides the scum removal duct. In such an instance, the effluent liquid will have entrained in it, those suspended solids that have escaped or been immune to the flotation effects of the vacuum.

However, in other cases, it will be desirable to make a further separation by riding the effluent liquid of its suspended solids that have escaped the vacuum flotation. This can be accomplished in the embodiment of the invention shown because the suspended solids that have escaped flotation will descend and settle on the floor 11 of the tank 10 by sedimentation processes, and will accumulate as sediment on the floor. The sludge rakes 64 in being moved at speeds that have a substantially non-roiling effect on the sediment, by the travelling rake arms 63 due to rotation of the shaft 22 and draft-tube 18, will impel the sediment inwardly toward the center of the tank 10 until the sediment reaches the sludge sump 66, from whence the sediment or sludge can be removed by the pump 67 and discarded through pipe 68 into the sump 72. In such a case, it can be seen that the sediment and the effluent liquid are discharged from the tank 10 by separate and independent paths. The level at which the effluent take-off is located is deep enough in the tank to be at a point where the effect of vacuum is so slight that practially all floating material is thereabove, for it is quite important that no, or substantially no, floating material pass from the tank with the treated effluent. More particularly, the location of the effluent take-off should be sufficiently below the liquid level of the tank that the effect of the vacuum at that take-off level is less than or equivalent to not substantially more than 5 inches of mercury. Since the feed to the vacuator is continuous, and the scum and the effluent take-offs are continuous, the operation of the machine is continuous, and the liquid being treated in the vacuator is an ever-changing body of liquid. The sludge can be taken out intermittently or continuously as desired.

From the sump 72 the mixture of discharged scum and sludge can be conducted, through the medium of pump 74, for further treatment such as by anaerobic or other biologic digestion. The effluent of treated liquid passing out of the pipe 55 and its barometric leg 56 is then available for release or for further treatment, as may be desired.

As the liquid level in the main tank 10 is controlled by the adjusted height of the suction nozzles 37 in the secondary tank or compartment 30, by the adjustment of the nozzles 37, the liquid level in the tank 10 can be raised or lowered relatively to the height of the scum overflow dam 15. If the discharging scum is desired to be dewatered as much as possible, then the liquid level is dropped somewhat below the scum dam 15. On the other hand, in order to make the discharging scum more fluid, it may be desirable to have more water go out with it, in which case the liquid level in the tank 10 is raised with respect to the scum dam, by means of suitable adjustment of the pivoted vacuum suction nozzles 37.

A Vacuator may be looked upon as an efficient substitute, at least in many instances, for a present-day mechanically-cleaned clarifier, for experience has shown that a Vacuator is effective in ridding the liquid being treated of a substantial portion of its suspended solids in about the proportion of 75% of floated suspended solids and 25% of settled solids. When the grease or oil content of the liquid is high, the floated solids removal is higher than otherwise. Further, the sludge discharging from a Vacuator is cleaner in that it has fewer, smaller and lighter particles entrained in it, for the sludge has in effect been exposed to what may be called a washing treatment. In a clarifier, the detention capacity is from one to three hours, whereas good results have been obtained in a Vacuator having only three minutes detention, although from one to fifteen minutes may be used, as appears requisite. This represents an enormous saving in size as compared with an ordinary clarifier.

Initial operation for starting up a Vacuator can be carried out by one of two methods. The preferred method is to close all valves 84 and 55' on the inlet and outlet piping respectively so that the tank 10 can be filled by a pump (not shown). When the water level reaches the elevation of the scum dam 15, the pumping can be discontinued, the air-outlet connections closed, to wit, air outflow pipes controlled by valves 40' the vacuum pump 35 started, and as soon as the vacuum gauge used in connection with the pump 35 registers equivalent to the hydrostatic leg in the tank, valves 84 and 55' in the inlet and outlet piping respectively can be opened simultaneously, and flow through the inverted siphon 19 and 18 will automatically start. Obviously all hydrostatic legs must be kept sealed with liquid.

The respective water levels in the feed and effluent compartments will automatically adjust themselves, depending upon the loss of head through the unit and the elevation of the overflow weir in an effluent box.

The other method of starting consists in maintaining sufficient water in the boxes or pools in which the hydrostatic legs are located, starting the vacuum pump and thus pulling the water up into the tank as the absolute pressure is decreased.

For shut-downs of several hours' duration, all valves in the inlet and outlet piping can be closed when the flow has stopped, and the vacuum pump can then be shut down without emptying the tank contents. For shut-downs of longer duration, the device can be emptied by stopping the vacuum pump and admitting air slowly through a suitable valve in the tank cover.

The normal adjustments obtainable during regular operation consists principally of:

1. Control of water level elevation; and
2. Speed variation of skimmer mechanism.

If for instance a material being handled forms a thick compact scum and it is desired to discharge this scum with a minimum water content, then the water level in the control box should be adjusted by raising or lowering the nozzle to an elevation several inches below the scum dam. If, on the other hand, the material handled does not form a compact scum or its water content is not important, the water-level elevation can then be adjusted to substantially that of the scum dam so that most or all of the scum will flow into the scum outlet by gravity. In some extreme or unusual cases it may be advantageous to raise the water level above the scum dam.

The presence of finely-divided gas bubbles in sewage or other liquid has a decidedly detrimental effect on clarification by sedimentation; so to rid the sewage of its entrained gas, substantially facilitates the subsequent sedimentation. And again, as sewage and the like wastes are usually highly odorous, the vacuum removal of this invention rids the liquid of its entrained gases and thereby reduces their odor-giving content.

In the gassing, or diffusing of a gas in sewage, it has been found that sewage and certain other polluted waste liquids, have an oxygen demand. This is commonly referred to as B. O. D., which is an abbreviation of biochemical oxygen demand. If one attempts to diffuse air in such a liquid, the oxygen demand is so great that instead of the air being dissolved or entrained in the liquid, the oxygen of the air enters into chemical combination, with the result that when the aerated liquid gets into the scum flotation apparatus, the lessened pressure on the liquid fails to develop gas bubbles as it would, due to the air coming out of solution and entrainment. Consequently it is proposed by this invention, in connection with oxygen demanding liquids, to practice the gassing step heretofore described, by the use of some gas that is inert to the oxygen demand of the liquid. For instance, in the treatment of sewage, it has been found that the gassing step can be satisfactorily carried out by the use of carbon dioxide ($CO_2$) gas. This has the advantage not only of being readily soluble in the sewage liquid, but upon encountering the lessened pressure, due to the effect of vacuum in the scum floating apparatus, the $CO_2$ comes out of solution and develops a maximum of very small bubbles, that are highly effective for flotation purposes.

Since the solubility of nitrogen in water is twice that of oxygen, it is indicated that a nitrogen bearing gas can well be used. Of course, if the gassing be done with a gas other than air, the gassing must be done in a manner so that the gas is not allowed to be wasted, so under such conditions, the gasing station 79 would have to be provided with a pipe or duct 100 that conveys the $CO_2$ or other inert gas for release directly into the agitation zone of the aerating or gassing element 78. The point of this feature of this invention is the supplying, to an oxygen demanding liquid, of a gas that is inert to the oxygen demand of the liquid. Maximum solution and entrainment of the gas in the liquid is desired with a minimum of chemical reaction of the gas with the liquid.

We claim:

1. The process of removing suspended solids from their carrying liquid which comprises maintaining an enclosed body of liquid being treated whose liquid level is subject normally to vertical fluctuations, continually supplying gas-containing liquid to the liquid body and conducting such liquid to the region of the surface of the liquid body, continually sucking liquid through a pipe inlet disposed cooperatively within the limits of the fluctuating liquid lever alternately liquid when the liquid level rises thereabove and gas when the liquid level falls therebelow whereby to substantially minimize fluctuations of the level of the liquid body and whereby to continually maintain on the surface of the body sub-atmospheric pressure, continually removing floating matter from the surface of the body at a point functionally remote from the point of application of the suction, and continually removing from the body clarified liquid.

2. The process of removing suspensions from a liquid bearing them which comprises establishing and enclosing liquid divided into a major liquid body and a minor liquid body with both bodies having a common atmosphere and with liquid in the minor body having a vertically fluctuating liquid level, supplying feed liquid to the major body, removing floating scum from the major liquid body, discharging effluent from the enclosed liquid from a place functionally remote from the floating scum, sucking liquid from the minor body when the liquid level thereof rises above a predetermined elevation, and sucking gas from above such liquid when the liquid level thereof falls below such predetermined elevation.

3. Apparatus for the removal of suspensions from a liquid bearing them which comprises a closed tank adapted to hold a liquid body whose level normally varies, feed-liquid tube means having a terminal ending within the tank by which liquid is supplied thereto, conduit means having an inlet for removing from the tank material floating at the liquid level thereof, means for maintaining on the liquid in the tank a gaseous medium at sub-atmospheric pressure including suction means having an inlet extending cooperatively within the range of variations of the liquid level and independent of the floating material removing means adapted to pump liquid through the suction means when the liquid level rises thereabove and thus controlling the liquid level of the tank, and means for removing treated liquid from the tank having an inlet in the tank that is disposed functionally remote from the inlet to the floating material removing means.

4. Apparatus according to claim 3, including means providing an auxiliary compartment associated with the tank for holding in its lower portion liquid derived from the liquid of the tank and having its top portion in gaseous communication with the space above the liquid in the tank, with the addition that the inlet of the suction means is adjustable and is associated with the auxiliary compartment for controlling the liquid level of the liquid therein.

5. Apparatus for the removal of suspensions from liquids comprising a closed tank adapted to hold a liquid body having a normally vertically fluctuating liquid level, tube means by which gassed liquid may be fed into the tank and delivered in the region of the surface level of the liquid in the tank, combined wet and dry suction means adapted to maintain sub-atmospheric pressure within the tank including a pipe having an inlet disposed within the vertical limits of the fluctuating liquid level, and a pump connected with said pipe effective to draw liquid therethrough when the inlet is submerged and to draw gas therethrough when the inlet is unsubmerged, a scum-discharge duct leading from the tank including a liquid seal thereon exteriorly of the tank, means for sweeping floating scum into the tank, means for sweeping floating scum into the scum duct, and means for conducting treated liquid from the tank including a liquid-sealed lower end outside the tank.

6. Apparatus according to claim 5 with the addition of a dam provided at tne upper intake end portion of the scum discharge duct over which floating material must pass before entering said duct, and wherein said suction means includes adjustable means for varying the liquid level relative to the dam.

7. Apparatus for removal of impurities from liquids comprising a closed tank adapted to hold a liquid body, tube means by which gas-containing liquid may be fed to the tank and delivered at the region of the liquid level in the tank, suction-producing means for maintaining vacuum within the tank, a scum-discharge duct including a dam at the upper end thereof and having a liquid-sealed lower end, means for sweeping floating material in the tank over the dam and into the scum duct, means for removing treated liquid from the tank at an elevation lower than that of said dam and having a liquid-sealed lower end, said suction-producing means having a positionable suction inlet disposed at an elevation proximate to that of the upper edge of the dam and effective to control the relative height between the liquid level of the tank and the dam.

8. Apparatus according to claim 7 wherein the float-sweeping means is functionally separated from the positionable suction inlet.

9. Apparatus for removal of suspended matter from liquid comprising a tank adapted to hold a main body of liquid being treated, tube means leading into the tank and having a terminal from which gas-containing liquid being treated is delivered within the tank, means for maintaining adjacent the main liquid body a second body of liquid whose liquid level is subject to vertical fluctuations and which has a common atmosphere with the main body, means for connecting the atmosphere of the second body with that of the main body, means providing a passageway for flow of liquid from one body to the other, means for removing from the tank material floating on the main body, means for removing treated liquid from the tank, and suction means essentially embodying a gas-liquid pump and a pipe having an inlet disposed cooperatively within the vertical limits of the fluctuating level of the second liquid body serving for alternately withdrawing liquid through the pipe inlet when submerged and gas when unsubmerged for thereby controlling the liquid level of the second liquid body as well as for applying vacuum to the common atmosphere of the main and second liquid bodies.

10. Apparatus for the treatment of liquids having suspensions therein which comprises a closed tank adapted to hold liquid with at least a portion of which whose liquid level fluctuates vertically, tube means terminating in the tank for supplying gas-containing feed liquid thereto, scum-receiving means having an inlet disposed to receive floating scum, means for passing scum from the tank through said receiving means while minimizing leakage of air therethrough, suction means leading from the tank having an inlet disposed functionally remote from the scum inlet but within the range of fluctuations of the liquid level for sucking liquid when the inlet is submerged and gas when nonsubmerged whereby sub-atmospheric pressure is maintained on the tank liquid, effluent discharge conduit means leading from the tank having an inlet section that is disposed functionally remote from the scum-receiving means, liquid-seal means exteriorly of the tank associated with the effluent discharge means for minimizing leakage of air therethrough, and means for shielding from suspended and settling solids the inlet section of the conduit means.

11. Vacuum flotation apparatus comprising a closed tank adapted to hold a body of liquid therein having a liquid level, feed inlet means having a rotatable feed-emission terminal and a fixed delivery section leading thereto by which gas-containing liquid suspension is fed into the tank and released into the liquid body at the region of the surface level thereof, suction means for applying sub-atmospheric pressure to the surface of the liquid in the tank, a scum-discharge duct leading from the tank proximate to the liquid level therein, means for sweeping floating scum thereinto, a motor-driven shaft extending vertically into the tank, conduit means leading from the tank for conducting treated liquid therefrom, independent liquid-seal means for the scum duct and for the conduit means provided exteriorly of the tank for minimizing leakage of air therethrough, the emission terminal section of the feed inlet means being supported and rotated from said shaft, and the scum-sweeping means being also supported and rotated from said shaft.

12. An apparatus for performing a continuous process for separating and removing of suspended matter from a liquid which comprises a closed top main separating tank adapted for the establishment therein of an ever-changing main body of liquid for treatment normally maintained at a pre-determined liquid level and of a gas-holding portion that directly overlies said liquid body whose pressure is maintained substantially lower than that of the outside atmosphere; means providing an auxiliary liquid-height control compartment having a lower liquid-holding portion adapted for the establishment therein of an auxiliary body of liquid derived from the main tank and an overlying gas-holding portion; means defining a freely communicating gas passageway between said gas-holding portions; pumping means for removing gas from said gas-holding portions and adapted for maintaining substantially sub-atmospheric pressure conditions therein and comprising on the intake side thereof piping having suction nozzle structure providing nozzle intake means operatively disposed within the auxiliary liquid-height control compartment adapted to establish at the elevation of the nozzle intake means the normal liquid level of the body of liquid in the main tank and also to remove any liquid tending to rise above the so-established normal liquid level; means for continuously submergedly delivering a liquid-solids suspension into the main tank while permitting no substantial leaking of outside air into the main tank; means for continuously releasing liquid from the main tank without permitting any substantial leakage of outside air into the main tank; an open top trough located within the main tank having a horizontally extending transfer edge at an elevation proximate that of the nozzle intake means; and means for transferring material from said open top trough to the exterior of the apparatus without permitting any substantial leakage of outside air into the tank.

13. An apparatus according to claim 12, also having means for impelling floatable matter from the surface of the body of liquid in the main tank towards and over the horizontally extend transfer edge of the trough and thus into the open top trough.

EARL M. KELLY.
ARTHUR M. KIVARI.
ROBERT P. KITE.
ELLIOTT J. ROBERTS.
DAVID B. SUTHERLAND.